Sept. 3, 1968   W. H. HOLLE ETAL   3,399,595
FOCUSING SYSTEM FOR PROJECTORS
Filed May 19, 1966
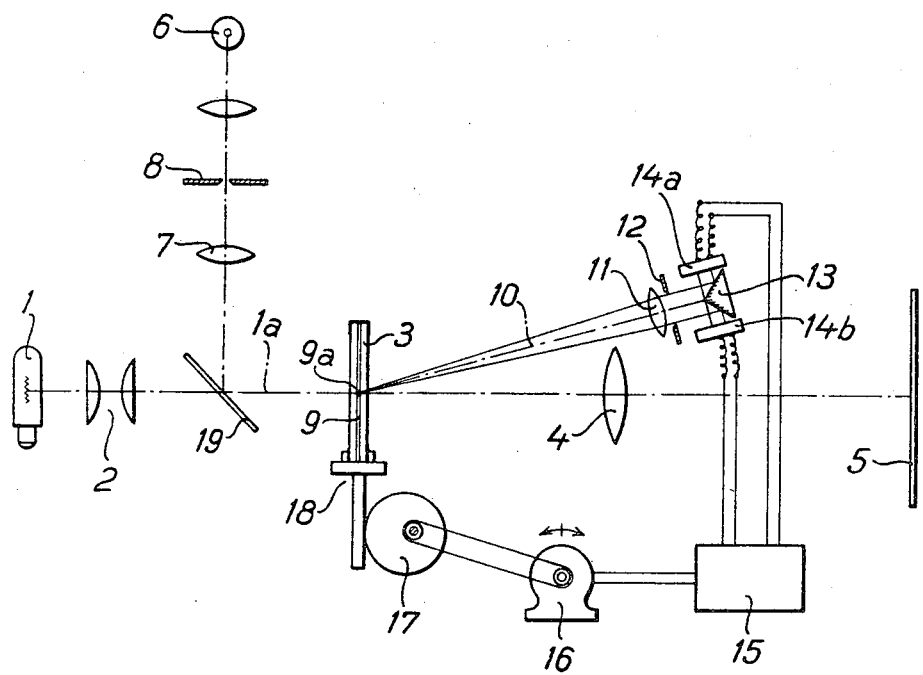
INVENTORS
WERNER HOLLE
RUDOLF KREILING
By *Krafft & Wells*
ATTORNEYS United States Patent Office 3,399,595
Patented Sept. 3, 1968

3,399,595
FOCUSING SYSTEM FOR PROJECTORS
Werner H. Holle, Wetzlar, and Rudolf Kreiling, Giessen, Germany, assignors to Ernst Leitz G.m.b.H., Wetzlar, Germany
Filed May 19, 1966, Ser. No. 551,338
Claims priority, application Germany, June 3, 1965, L 50,844
6 Claims. (Cl. 88—24)

CROSS-REFERENCES TO RELATED APPLICATIONS

Applicants claim priority under 35 U.S.C. 119 for German application No. L 50,844, filed June 3, 1965.

SUMMARY OF THE INVENTION

The present invention relates generally to focusing systems for projectors and is particularly concerned with an improved focusing system having light-sensitive meters responsive to light falling on the film being projected.

In a particular embodiment of the present invention for carrying out the improvement, an optical apparatus is provided which forms on the transparency being projected an image of a slit by means of radiation from beyond the visible portion of the spectrum. The dispersed radiation from such image is then received by a measuring apparatus positions just beyond the angle of reflection of the illuminating beams. The illuminating system preferably has a small aperture so that the slit will produce an image whose sharpness will not depend on the position of the transparency. The incident rays can be inclined to the transparency, but in order to avoid errors that would result from displacement, it is preferable, by the use of a mirror, to bring the beam parallel to or into coincidence with the optic axis. To produce an image of the slit, it is preferable to use either ultra-violet or infrared light, neither of which produce any disturbing effect on the picture being projected.

BACKGROUND OF THE INVENTION

In the operation of a present day projection apparatus, particularly wherein high image magnifications and high intensity light sources are employed, it is usually necessary to adjust and readjust the objective to provide a proper focus upon the associated viewing screen.

Systems are known which control the focusing mechanism by motor-driven gearing actuated by measuring and signaling devices which are responsive to light reflected from the film being projected. The signaling device comprises a photocell positioned in the path of light radiation reflected from the film. The response of the measuring device is transmitted in a suitable manner to the focusing mechanism. Such prior art systems are disclosed in U.S. Patents 2,872,841, 2,947,215, 3,037,423, German Patent 914,462 and German Patent 28,184, the disclosures of which are incorporated herein.

These prior art systems have, however, the disadvantage of giving satisfactory responses only in those embodiments where the transparency is not enclosed in glass. If glass-enclosed transparencies are used, some of the light will be reflected from the surface of the glass and will energize the measuring device to produce erratic results. This difficulty cannot be eliminated by the use of diaphragms limiting the width of the light beam.

DESCRIPTION OF THE INVENTION

It is an object of the present invention to provide a projector focusing system which will permit accurate focusing with all transparencies.

Another object of the invention is to provide a projector focusing system permitting accurate focusing with glass-enclosed transparencies.

A further object of the present invention is to provide a projector focusing system actuated by a beam of light from beyond the visible portion of the spectrum.

A particular object of the present invention is to provide a projector focusing system actuated by a beam of infrared light.

Another particular object of the invention is to provide a projector focusing system actuated by a beam of ultraviolet light.

Still further objects and advantages of the present invention will become obvious from the specification and claims which follow, particularly when taken in conjunction with the accompanying drawing wherein:

The figure is a diagrammatic showing of a typical and illustrative embodiment.

In the drawing the light source 1 and the condenser 2 serve in a known manner to illuminate the transparency 3 which is positioned in the optic axis 1a to have its image projected by the objective 4 upon the screen 5. The measuring radiation is emitted from an ultraviolet light source 6. By means of the lens 7 and two-way mirror 19, and image 9a of the slit 8 is projected upon the surface of the film 9. The image 9a is not visible and does not interfere with the image of the transparency that is projected on the screen. The measuring device which is positioned on the axis 10 on the side of the film that faces toward the objective 4, comprises an objective 11, a diaphragm 12, a prism 13 for dividing the beam into two components, and the photocells 14a, 14b that are energized respectively by these components. The optic axis 10 of this system forms an acute angle with the axis 1a. The axis 10 is outside of the direct radiation of axis 1a and is outside of the direct radiation of the light reflected from the cover glasses of the transparency 3, so that the measurement is performed only with the dispersed radiation from the image 9a of the slit. The two photocells 14a, 14b are electrically connected with a control device 15 which responds when the photocells are unequally illuminated by the dispersed radiation so as to rotate the motor 16 clockwise or counterclockwise. The motor drives an eccentric 17 which moves the picture support 18 back and forth. As soon as the film has moved into the focal plane, the photocells are equally illuminated by the two component beams of equal intensity so that the controlling device 15 is no longer energized and the motor 16 comes to a standstill.

The measuring apparatus can be constructed in the same manner as similar apparatus of this kind. For example, two photocells are provided and to each of them half of the measuring radiation is directed. It is, therefore, not important to this invention what the intensity of the radiation may be. The flatness of the surface of the film and its transparency do not affect the accuracy of the measurement.

It is not important whether the measuring device is positioned in front of or behind the film. In order, however, to permit the maximum range of dispersion to be used in making the measurement, it is preferable to position the measuring device on that side of the film which faces toward the objective of the projector.

Another feature of this invention is that the axis of the measuring beam bundle is in a direction as close as possible to the aperture angle of the light from the projector. The optically active parts of the measuring device should therefore be positioned close to the projector's objective. The purpose of such an arrangement is to give to the measuring device approximately the same optical dimensions as those of the projector's objective, which will result especially in a substantial elimination of longitudinal aberration.

In order to provide a further understanding of the invention, applicants provide below an explanation of the principles of the invention. It is not, however, applicants' intention to be limited thereby.

The prior art systems operate on the principle of measuring reflected rays, but on the contrary, the present invention does not. Upon the film 9 of the drawing, which may or may not be covered by glass, a slit of light 9a is provided. The bright spot 9a on the relatively rough surface of the film produces rays which pass in all directions. Ultraviolet or other light from the invisible portion of the spectrum is used so that the spot will not be visible on the projection screen to disturb the picture being projected.

Any glass surfaces used in front or behind the film will not have the bright spot thereon because the glass surfaces are smooth and not roughened.

It will be understood that this invention is susceptible to modification in order to adapt it to different usages and conditions and, accordingly, it is desired to comprehend such modifications within this invention as may fall within the scope of the appended claims.

We claim:

1. A projector focusing system having means for focusing connected to and operated by means for measuring light radiation, and further comprising as a source of said radiation, light impinged upon a film, the improvement comprising means for illuminating comprising light radiation outside the range of the visible spectrum in combination with means for providing an image of a slit on the surface of a film, said means for measuring light radiation located at any given angle outside the reflection angle of said image of a slit whereby measurement is performed by the dispersed radiation from said image of the slit.

2. The projector focusing system of claim 1, wherein said means for illuminating comprises ultraviolet light.

3. The projector focusing system of claim 1, wherein said means for illuminating comprises infrared light.

4. The projector focusing system of claim 1, wherein said means for measuring light radiation is located on the objective side of the film being projected.

5. The projector focusing system of claim 1, wherein the projector has an optic axis of projection and an aperture angle of the projector's objective, and said given angle of said means for measuring light radiation is acute to said optic axis and lies closely adjacent said aperture angle.

6. The projector focusing system of claim 1, further comprising a two-way mirror in combination with said means for illuminating and said means for providing an image of a slit.

References Cited

UNITED STATES PATENTS

| | | | |
|---|---|---|---|
| 2,947,215 | 8/1960 | Mitchell | 88—24 |
| 3,037,423 | 6/1962 | Shurcliff | 88—24 |
| 3,264,935 | 8/1966 | Vose | 88—24 |
| 3,249,006 | 5/1966 | Stauffer | 352—140 |

NORTON ANSHER, *Primary Examiner.*

W. A. SIVERTSON, *Assistant Examiner.*